US010220680B2

(12) United States Patent
Ito et al.

(10) Patent No.: US 10,220,680 B2
(45) Date of Patent: Mar. 5, 2019

(54) HUMIDIFICATION DEVICE AND AIR CONDITIONER FOR VEHICLE

(71) Applicant: DENSO CORPORATION, Kariya, Aichi-pref. (JP)

(72) Inventors: Koji Ito, Kariya (JP); Takahito Nakamura, Kariya (JP); Daisuke Sakakibara, Kariya (JP); Shinya Kato, Kariya (JP); Jun Yamaoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/551,929

(22) PCT Filed: Feb. 24, 2016

(86) PCT No.: PCT/JP2016/055398
§ 371 (c)(1),
(2) Date: Aug. 18, 2017

(87) PCT Pub. No.: WO2016/147819
PCT Pub. Date: Sep. 22, 2016

(65) Prior Publication Data
US 2018/0029445 A1    Feb. 1, 2018

(30) Foreign Application Priority Data

Mar. 19, 2015   (JP) .................................. 2015-056255

(51) Int. Cl.
*B60H 1/32*       (2006.01)
*F24F 3/14*       (2006.01)
*B60H 3/02*       (2006.01)

(52) U.S. Cl.
CPC ........... *B60H 1/3201* (2013.01); *B60H 3/022* (2013.01); *F24F 3/14* (2013.01); *F24F 3/1411* (2013.01);
(Continued)

(58) Field of Classification Search
CPC ...... B60H 1/3201; B60H 1/3207; B60H 3/02; B60H 3/022; B60H 3/024; B60H 2003/028; F24F 3/14; F24F 3/1411; F24F 3/1423

See application file for complete search history.

(56) References Cited

U.S. PATENT DOCUMENTS 4,340,112 A    7/1982   Sutoh et al.
5,514,035 A    5/1996   Denniston
(Continued)

FOREIGN PATENT DOCUMENTS

JP    S56031812 A    3/1981
JP    H11500081 A    1/1999
(Continued)

OTHER PUBLICATIONS

U.S. Appl. No. 15/551,935, filed Aug. 18, 2017, Ito et al.
U.S. Appl. No. 15/551,947, filed Aug. 18, 2017, Kato et al.

*Primary Examiner* — Jonathan Bradford
(74) *Attorney, Agent, or Firm* — Harness, Dickey & Pierce, P.L.C.

(57) ABSTRACT

A humidification device includes: an adsorber having an adsorbent that adsorbs and desorbs moisture; an adsorption case that forms an accommodating space to accommodate the adsorber; a first introduction portion that introduces cooled air produced by a cooling portion into the adsorption case; a second introduction portion that introduces heated air produced by the heating portion into the adsorption case; and a humidification-side guiding portion that guides humidification air humidified by the moisture desorbed within the adsorption case, to the vehicle interior. The first introduction portion is connected to a bottom surface portion of the air-conditioning case on the air-flow downstream side of the cooling portion in the air-conditioning case.

19 Claims, 7 Drawing Sheets

(52) U.S. Cl.
CPC ...... *F24F 3/1423* (2013.01); *B60H 2003/028* (2013.01)

(56) References Cited

U.S. PATENT DOCUMENTS

| | | |
|---|---|---|
| 5,873,256 A | 2/1999 | Denniston |
| 6,092,375 A | 7/2000 | Denniston |
| 6,205,805 B1 | 3/2001 | Takahashi et al. |
| 6,481,222 B1 | 11/2002 | Denniston |
| 2010/0281904 A1* | 11/2010 | Yokomachi .......... F24F 3/1423 62/271 |
| 2016/0054013 A1 | 2/2016 | Komatsubara |

FOREIGN PATENT DOCUMENTS

| | | | |
|---|---|---|---|
| JP | 2000108655 A | | 4/2000 |
| JP | 2005282992 A | | 10/2005 |
| JP | 2006232232 A | * | 9/2006 |
| JP | 2006306293 A | | 11/2006 |
| JP | 2008137420 A | | 6/2008 |
| JP | 2009196511 A | | 9/2009 |
| JP | 2013244773 A | | 12/2013 |
| JP | 2015217917 A | | 12/2015 |

* cited by examiner

HUMIDIFICATION DEVICE AND AIR CONDITIONER FOR VEHICLE

CROSS REFERENCE TO RELATED APPLICATIONS

This application is a U.S. National Phase Application under 35 U.S.C. 371 of International Application No. PCT/JP2016/055398 filed on Feb. 24, 2016 and published in Japanese as WO 2016/147819 A1 on Sep. 22, 2016. This application is based on and claims the benefit of priority from Japanese Patent Application No. 2015-056255 filed on Mar. 19, 2015. The entire disclosures of all of the above applications are incorporated herein by reference.

FIELD OF THE INVENTION

The present disclosure relates to a humidification device applied to an air-conditioning unit, and an air conditioner for a vehicle that includes an air-conditioning unit and a humidification device.

BACKGROUND ART

Conventionally, there is a known air-conditioning unit for a vehicle equipped with a humidifier that humidifies the vehicle interior (see, for example, Patent Document 1). Patent Document 1 discloses an air-conditioning unit that includes permeable tubes designed to vaporize water and disposed in a duct to guide temperature-adjusted air into the vehicle interior, so that water stored in a tank is supplied to the permeable tubes, thereby humidifying the air before it is blown into the vehicle interior.

RELATED ART DOCUMENT

Patent Document

Patent Document 1: Japanese Unexamined Patent Application Publication No. 2005-282992

SUMMARY OF THE INVENTION

In the technique disclosed in Patent Document 1, the amount of water in the tank decreases gradually along with the humidification of the vehicle interior as the water is supplied to the permeable tubes. For this reason, the tank needs to be replenished with water.

However, in vehicles as a movable body, there is a limitation on the amount of water for replenishing the tank. If the water in the tank and water for replenishing the tank cannot be ensured, the vehicle interior cannot be efficiently humidified.

Therefore, it is an object of the present disclosure to provide a humidification device and an air conditioner for a vehicle that can efficiently humidify the vehicle interior without being supplied with water from the outside.

The inventors have focused on the tendency that air existing at a side of a bottom surface portion of an air-conditioning case of the air-conditioning unit has a higher relative humidity than the air existing at a side of an upper surface portion thereof. Based on this, the present disclosure has been made.

According to an aspect of the present disclosure, a humidification device is used for an air-conditioning unit that accommodates a cooling portion that cools ventilation air and a heating portion that heats ventilation air, in an air-conditioning case that forms a ventilation passage for the ventilation air into a vehicle interior.

The humidification device includes an adsorber including an adsorbent that adsorbs and desorbs moisture; an adsorption case that defines an accommodating space to accommodate the adsorber; a first introduction portion that introduces cooled air produced by the cooling portion into the adsorption case, as air that causes moisture to be adsorbed into the adsorbent; a second introduction portion that introduces heated air produced by the heating portion into the adsorption case, as air that causes the moisture adsorbed in the adsorbent, to be desorbed from the adsorbent; and a humidification-side guiding portion that guides humidification air humidified by the moisture desorbed within the adsorption case, to the vehicle interior.

The first introduction portion is connected to a bottom surface portion of the air-conditioning case on an air-flow downstream side of the cooling portion in the air-conditioning case.

According to another aspect of the present disclosure, an air conditioner for a vehicle includes: an air-conditioning unit that accommodates a cooling portion that cools ventilation air and a heating portion that heats the ventilation air, in an air-conditioning case that forms a ventilation passage for the ventilation air into a vehicle interior; and a humidification device that desorbs moisture adsorbed in an adsorbent of an adsorber and guides humidification air, humidified by the moisture desorbed from the adsorbent, to the vehicle interior.

The humidification device for an air conditioner of a vehicle includes: an adsorption case that forms an accommodating space to accommodate the adsorber; a first introduction portion that introduces the cooled air produced by the cooling portion into the adsorption case, as air that causes moisture to be adsorbed into the adsorbent; a second introduction portion that introduces heated air produced by the heating portion into the adsorption case, as air that causes the moisture adsorbed into the adsorbent, to be desorbed from the adsorbent; and a humidification-side guiding portion that guides the humidification air humidified by the moisture desorbed within the adsorption case, to the vehicle interior.

In addition, the first introduction portion is connected to a bottom surface portion of the air-conditioning case on the air-flow downstream side of the cooling portion in the air-conditioning case.

With this arrangement, the moisture of the cooled air produced by the air-conditioning unit can be used to humidify the vehicle interior, and thereby there is no need for water to be supplied from the outside into the vehicle air conditioner. In particular, the first introduction portion that introduces the cooled air into the adsorption case is connected to the bottom surface portion of the air-conditioning case on the air-flow downstream side of the cooling portion in the air-conditioning case. Thus, the cooled air at a comparatively high relative humidity inside the air-conditioning case is introduced into the adsorption case, so that the adsorption amount of moisture into the adsorbent can be sufficiently ensured.

Therefore, the present disclosure can efficiently humidify the vehicle interior without supplying any water from the outside into the vehicle air conditioner.

Here, with a structure that guides the cooled air, produced by the cooling portion provided in the air-conditioning unit, to the adsorbent, the condensed water generated in the cooling portion might possibly be introduced into the adsorbent, together with the cooled air. The condensed water occasionally contains impurities, such as bacteria. Such a situation is not desirable because, once the condensed water is adsorbed in the adsorbent, mold might be generated in the adsorbent, or the adsorbent itself might become a source of bad smell.

In another aspect of the present disclosure, the air-conditioning case has a drain discharge portion formed at a part on a lower side of the cooling portion at the bottom surface portion of the air-conditioning case. The drain discharging portion is adapted to discharge condensed water generated in the cooling portion. Furthermore, the first introduction portion is connected to a part on the air-flow downstream side relative to the drain discharge portion at the bottom surface portion of the air-conditioning case and on the air-flow downstream side of the cooling portion in the air-conditioning case.

Thus, the first introduction portion is connected to the air-flow downstream side of the drain discharge portion in the air-conditioning unit, thereby making it possible to prevent the adsorbent from being covered with the condensed water generated in the cooling portion.

DESCRIPTION OF EMBODIMENTS

Figure 1:
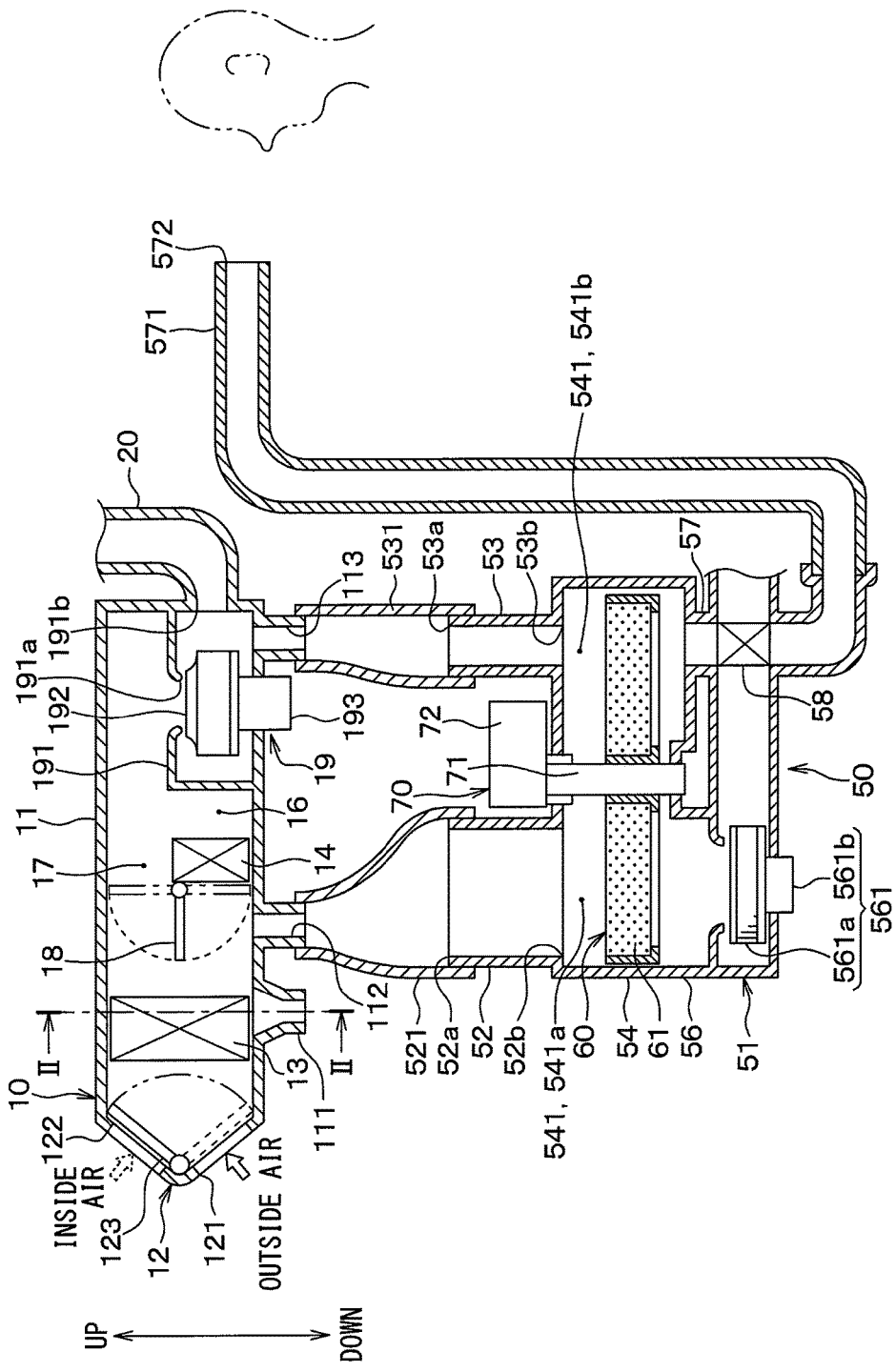
FIG. 1 is a schematic cross-sectional view showing an entire structure of a vehicle air conditioner that includes a humidification device according to a first embodiment.

Embodiments of the present disclosure will be described below with reference to the accompanying drawings. In the following respective embodiments, the same or equivalent parts as the matters explained in the previous embodiment(s) are denoted by the same reference numerals, and the description thereof will be omitted in some cases. When only part of a component in each of the embodiments is explained, other parts of the component can be applied to components explained in the previous embodiment(s).

First Embodiment

This embodiment will describe an example in which a vehicle air conditioner to perform air-conditioning of the vehicle interior is applied to a vehicle that obtains a driving force for vehicle traveling from an internal combustion engine (for example, engine) (not shown). As shown in FIG. 1, the vehicle air conditioner includes an air-conditioning unit 10 and a humidification device 50 as main components. Note that respective arrows indicating the upper and lower sides shown in FIG. 1 indicate the up and down directions when the vehicle air conditioner is mounted on the vehicle. The same goes for other drawings.

First, the air-conditioning unit 10 will be described. The air-conditioning unit 10 is disposed below a dashboard (i.e., an instrumental panel) in the vehicle interior. The air-conditioning unit 10 accommodates an evaporator 13 and a heater core 14 in an air-conditioning case 11 forming an outer shell of the air-conditioning unit.

The air-conditioning case 11 configures a ventilation passage through which the ventilation air is blown into the vehicle interior. The air-conditioning case 11 in this embodiment is formed of resin (for example, polypropylene) with some elasticity and excellent strength.

Figure 2:
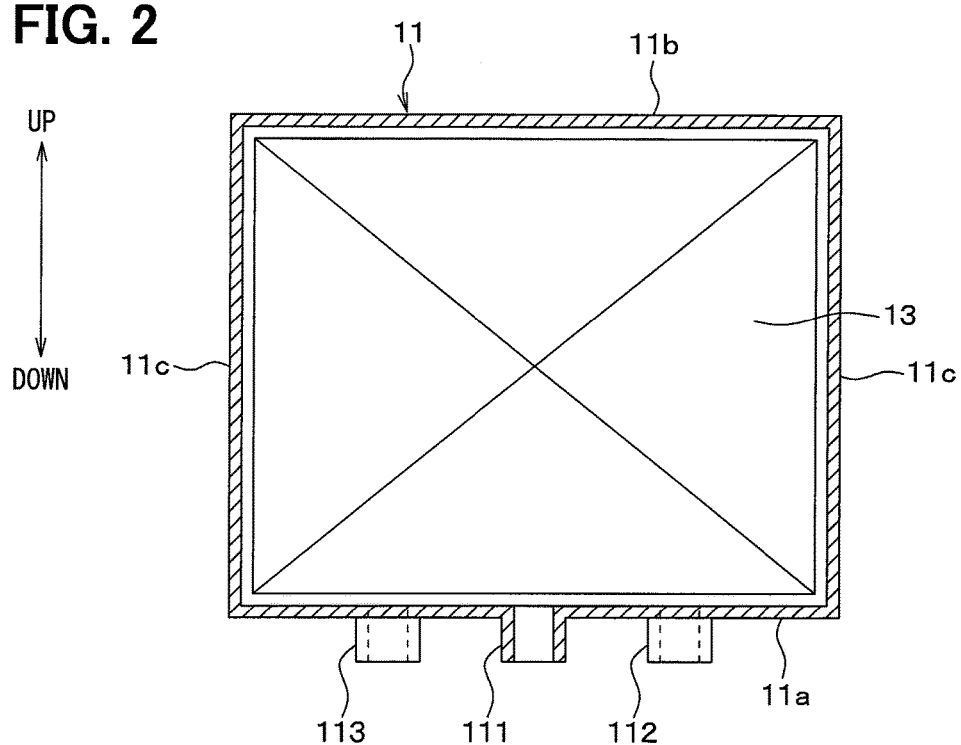
FIG. 2 is a cross-sectional view taken along the line II-II of FIG. 1.

Here, FIG. 2 shows a schematic cross-sectional view of the air-conditioning case 11 obtained when cutting the air-conditioning case 11 in a direction perpendicular to the air-flow direction. As shown in FIG. 2, in the air-conditioning case 11 of this embodiment, the ventilation passage through which the ventilation air flows is partitioned and formed by a bottom surface portion 11a, an upper surface portion 11b, and side surface portions 11c. Note that FIG. 2 illustrates an example in which a drain discharge portion 111, a cold-air guiding portion 112, and a hot-air guiding portion 113 to be described later are arranged in parallel in the right-left direction on a paper surface for the convenience of explanation, which obviously should not be construed in a limited sense.

The bottom surface portion 11a is a part configuring a lower-side wall surface that faces the bottoms of the evaporator 13, heater core 14, and the like in the air-conditioning case 11. The upper surface portion 11b is a part configuring an upper-side wall surface that faces the bottom surface portion 11a of the air-conditioning case 11. The side surface portions 11c are parts configuring wall surfaces of the air-conditioning case 11 other than the bottom surface portion 11a and the upper surface portion 11b. Note that in practice, the cross section of the air-conditioning case 11 is not in a quadrilateral shape, such as that shown in FIG. 2, in some cases. When the bottom surface portion 11a and the like are difficult to distinguish clearly in this way, the bottom surface portion 11a can be interpreted as a part that occupies one third on the lower side of the cross section of the air-conditioning case 11. The upper surface portion 11b can be interpreted as a part that occupies one third on the upper side of the cross section of the air-conditioning case 11. The side surface portions 11c can be interpreted as a part that occupies one third at the center part of the cross section of the air-conditioning case 11.

Returning to FIG. 1, an inside/outside air switching box 12 is disposed at the most upstream side of the air flow in the air-conditioning case 11 so as to switch between air outside a vehicle compartment (i.e., the outside air) and air in the vehicle interior (i.e., the inside air) and introduce the switched air into the air-conditioning case. The inside/outside air switching box 12 is provided with an outside-air introduction port 121 for introducing the outside air and an inside-air introduction port 122 for introducing the inside air. Furthermore, within the inside/outside air switching box 12, an inside/outside air switching door 123 is disposed to change the ratio of the introduced volume of the outside air to the introduced volume of the inside air by adjusting opening areas of the respective introduction ports 121 and 122.

The inside/outside air switching door 123 is rotatably disposed between the outside-air introduction port 121 and the inside-air introduction port 122. The inside/outside air switching door 123 is driven by an actuator (not shown).

The evaporator 13 is disposed on the air-flow downstream side of the inside/outside air switching box 12. The evaporator configures a cooling portion that cools the ventilation air to be blown into the vehicle interior. The evaporator 13 is a heat exchanger that absorbs, from the ventilation air, the latent heat of evaporation of a low-temperature refrigerant circulating therethrough, thereby cooling the ventilation air. The evaporator 13 configures a vapor compression refrigeration cycle together with a compressor, a condenser, and a decompression mechanism (all not shown).

A hot-air passage 16 and a cold-air bypass passage 17 are formed on the air-flow downstream side of the evaporator 13. The hot-air passage 16 allows the air cooled by the evaporator 13 to flow to the side of the heater core 14. The cold-air bypass passage 17 allows the air cooled by the evaporator 13 to flow bypassing the heater core 14.

The heater core 14 is a heat exchanger that heats the ventilation air by using a coolant for an internal combustion engine (not shown) (for example, engine) as a heat source. In this embodiment, the heater core 14 configures a heating portion that heats the ventilation air.

An air mix door 18 is rotatably disposed between the evaporator 13 and the heater core 14. The air mix door 18 is a member that is driven by an actuator (not shown) and regulates the temperature of the ventilation air to be blown into the vehicle interior by adjusting the ratio of the air circulating through the hot-air passage 16 to the air circulating through the cold-air bypass passage 17.

An air-conditioning blower 19 is disposed on the air-flow downstream side of the hot-air passage 16 and the cold-air bypass passage 17. The air-conditioning blower 19 is a device that generates an air flow within the air-conditioning case 11, to be blown into the vehicle interior. The air-conditioning blower 19 includes a blowing case 191, an air-conditioning fan 192, and an air-conditioning motor 193.

The blowing case 191 configures a part of the air-conditioning case 11. The blowing case 191 is provided with a suction port 191a for air and a discharge port 191b from which the air drawn via the suction port 191a is discharged.

The air-conditioning fan 192 draws the air on the air-flow downstream side of the hot-air passage 16 and cold-air bypass passage 17 via the suction port 191a and discharges the air from the discharge port 191b. The air-conditioning fan 192 in this embodiment is configured of a centrifugal fan that blows the air drawn thereinto from the axial direction toward the outside thereof in the radial direction. The air-conditioning fan 192 is rotatably driven by the air-conditioning motor 193. Note that the air-conditioning fan 192 is not limited to the centrifugal fan and may be configured of an axial fan, a cross flow fan, or the like.

The discharge port 191b of the air-conditioning blower 19 is connected to an air-conditioning duct 20. The air-conditioning duct 20 is a member that is opened within the vehicle interior and guides the ventilation air to outlet portions (not shown) to blow the air therefrom into the vehicle interior. Although not shown, the outlet portions include a face air outlet that blows air toward a side of an occupant's upper body, a foot air outlet that blows air toward a side of the occupant's lower body, and a defroster air outlet that blows air toward a windshield of the vehicle. The air-conditioning duct 20 or blowing case 191 is provided with a mode switching door (not shown) that sets a blowing mode of the air from each air outlet. The mode switching door is driven by an actuator (not shown).

Here, the air-conditioning case 11 in this embodiment has the drain discharge portion 111, the cold-air guiding portion 112, and the hot-air guiding portion 113, which are formed on its bottom surface portion 11a. The drain discharge portion 111 is an opening from which the condensed water generated in the evaporator 13 is discharged toward the outside of the vehicle. The drain discharge portion 111 in this embodiment is formed at a part of the bottom surface portion 11a of the air-conditioning case 11 that faces a lower end of the evaporator 13.

The cold-air guiding portion 112 is an opening through which part of the ventilation air (i.e., cooled air) cooled by the evaporator 13 in the air-conditioning case 11 is guided toward the outside of the air-conditioning case 11. The cold-air guiding portion 112 in this embodiment is formed at a part between the evaporator 13 and the heater core 14 at the bottom surface portion 11a of the air-conditioning case 11. More specifically, the cold-air guiding portion 112 is formed at the bottom surface portion 11a positioned between the drain discharge portion 111 and the heater core 14.

The hot-air guiding portion 113 is an opening through which part of the ventilation air (i.e., heated air) heated by the heater core 14 in the air-conditioning case 11 is guided toward the outside of the air-conditioning case 11. The hot-air guiding portion 113 in this embodiment is formed between the air-conditioning fan 192 and the discharge port 191b of the air-conditioning blower 19, at the bottom surface portion 11a of the air-conditioning case 11. The position where the hot-air guiding portion 113 in this embodiment is formed only needs to be on the air-flow downstream side of the air-conditioning blower 19, for example, may be in the air-conditioning duct 20 of the air-conditioning case 11.

Here, the air-conditioning unit 10 in this embodiment adopts a so-called suction type structure in which the air-conditioning blower 19 is disposed on the air-flow downstream side in the air-conditioning case 11. Thus, the internal pressure of the air-conditioning case 11 is lower than the pressure outside the air-conditioning case 11.

Subsequently, the humidification device 50 will be described. The humidification device 50 is disposed below the dashboard of the vehicle, like the air-conditioning unit 10. More specifically, the humidification device 50 is disposed on the lower side of the air-conditioning case 11 and in a position close to a part of the air-conditioning case 11 where the evaporator 13 is disposed, in such a manner as to make the cold-air guiding portion 112 of the air-conditioning case 11 close to a cold-air suction portion 52 of the humidification device 50 to be described later.

The humidification device 50 accommodates an adsorber 60 in an adsorption case 51 forming an outer shell of the humidification device. The adsorption case 51 configures a ventilation passage for the ventilation air. The adsorption case 51 is a component separately formed from the air-conditioning case 11. The adsorption case 51 is mainly divided into the cold-air suction portion 52, a hot-air suction portion 53, an adsorber accommodating portion 54, a cold-air discharge portion 56, and a hot-air discharge portion 57.

The cold-air suction portion 52 includes a first external introduction port 52a communicating with the outside thereof, and a first internal communication port 52b communicating with a moisture-adsorption space 541a of the adsorber accommodating portion 54 to be described later. The first external introduction port 52a is connected to a cold-air suction duct 521 for introduction of the cooled air produced by the evaporator 13.

The cold-air suction duct 521 connects the first external introduction port 52a of the cold-air suction portion 52 with the cold-air guiding portion 112 of the air-conditioning case 11. Together with the cold-air suction portion 52, the cold-air suction duct 521 in this embodiment configures a first introduction portion that introduces the cooled air produced by the evaporator 13 into the adsorption case 51, as air that causes moisture to be adsorbed into an adsorbent 61. The cold-air suction duct 521 is a component separately from the air-conditioning case 11, and configured to be detachable from the cold-air guiding portion 112 by a coupling member (not shown), such as a snap-fit.

The hot-air suction portion 53 includes a second external introduction port 53a communicating with the outside thereof, and a second internal communication port 53b communicating with a moisture-desorption space 541b of the adsorber accommodating portion 54 to be described later. The second external introduction port 53a is connected to a hot-air suction duct 531 for introduction of the heated air produced by the heater core 14.

The hot-air suction duct 531 connects the second external introduction port 53a of the hot-air suction portion 53 with the hot-air guiding portion 113 of the air-conditioning case 11. Together with the hot-air suction portion 53, the hot-air suction duct 531 in this embodiment configures a second introduction portion that introduces the heated air produced by the heater core 14 into the adsorption case 51, as air that causes moisture to be desorbed from the adsorbent 61. The hot-air suction duct 531 is a component separately from the air-conditioning case 11, and configured to be detachable from the hot-air guiding portion 113 by a coupling member (not shown), such as a snap-fit.

The hot-air suction duct 531 in this embodiment has its size set such that when a reference air volume is defined as a minimum air volume from the air-conditioning blower 19, the air volume of the heated air introduced via the hot-air suction duct 531 is smaller (for example, at 10 m$^3$/h, which is approximately 10% of the reference air volume) than the reference air volume. In this case, the heated air introduced via the hot-air suction duct 531 is sufficiently smaller than the reference air volume, which hardly affects an air-conditioning function of the side of the air-conditioning unit 10.

Figure 3:
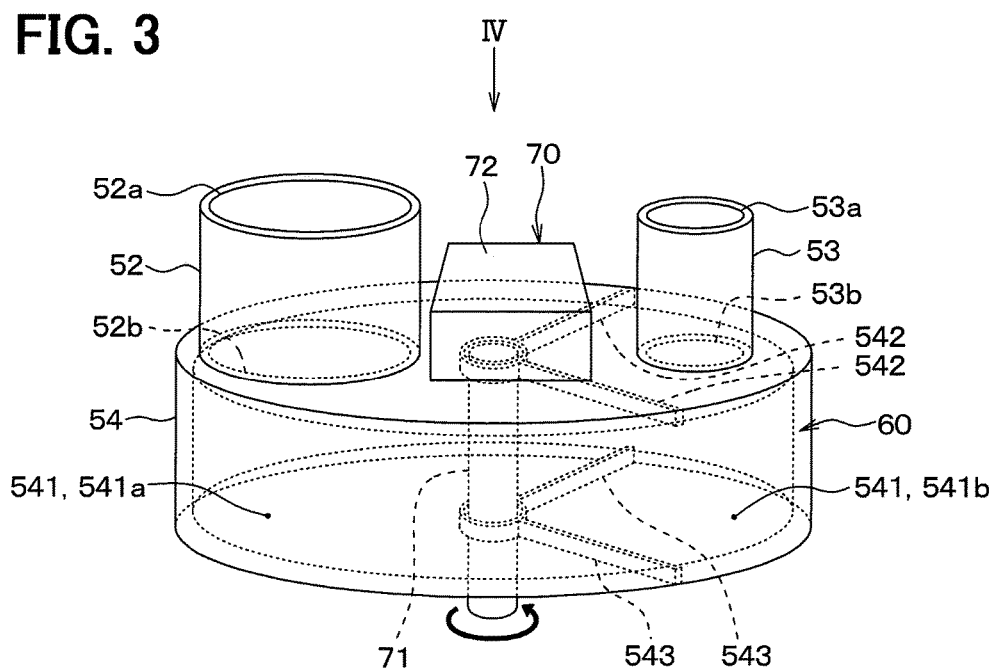
FIG. 3 is a perspective view showing a main part of the humidification device according to the first embodiment.
Figure 4:
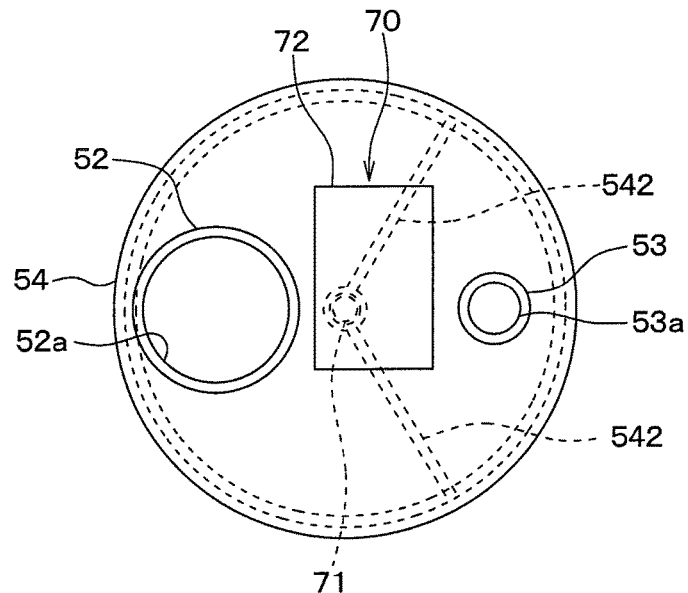
FIG. 4 is a diagram viewed from the direction indicated by the arrow IV of FIG. 3.

The adsorber accommodating portion 54 is a part that accommodates the adsorber 60 therein. As shown in FIGS. 3 and 4, the adsorber accommodating portion 54 in this embodiment has a hollow cylindrical contour. The adsorber accommodating portion 54 has an accommodating space 541 for the adsorber 60 formed therein.

The adsorber accommodating portion 54 sets, as the accommodating space 541, a space for circulation of the cooled air introduced via the cold-air suction portion 52 and a space for circulation of the heated air introduced via the hot-air suction portion 53.

Specifically, the accommodating space 541 is partitioned into the space for circulation of the cooled air and the space for circulation of the heated air by first and second partition members 542 and 543 that are provided on both the air-flow upstream and downstream sides of the adsorber 60.

The first partition member 542 is a member that is provided on the air-flow upstream side of the adsorber 60 and partitions the space on the air-flow upstream side of the adsorber 60 into a flow path for the cooled air and a flow path for the heated air. The first partition member 542 is integral with the inner side of an upper surface part of the adsorber accommodating portion 54.

The second partition member 543 is a member that is provided on the air-flow downstream side of the adsorber 60 and partitions the space on the air-flow downstream side of the adsorber 60 into the flow path for the cooled air and the flow path for the heated air. The second partition member 543 is integral with the inner side of a bottom surface part of the adsorber accommodating portion 54.

In the adsorber accommodating portion 54, the adsorber 60 is disposed to stride across both the space for circulation of the cooled air and the space for circulation of the heated air. The space for circulation of the cooled air in the adsorber accommodating portion 54 configures the moisture-adsorption space 541a that allows moisture contained in the cooled air to be adsorbed in the adsorbent 61 of the adsorber 60. The space for circulation of the heated air in the adsorber accommodating portion 54 configures the moisture-desorption space 541b that desorbs moisture adsorbed in the adsorbent 61 of the adsorber 60 therefrom and humidifies the heated air with the moisture.

Here, an adsorption rate of moisture per unit mass into the adsorbent 61 tends to be approximately twice as slow as a desorption rate of moisture per unit mass from the adsorbent 61. As the amount of the moisture adsorbed into the adsorbent 61 decreases, the amount of the moisture desorbed from the adsorbent 61 becomes less. Consequently, it might be difficult for the humidification device to sufficiently ensure the humidification amount of the vehicle interior.

When taking this into account, in this embodiment, the accommodating space 541 of the adsorber 60 is partitioned by the respective partition members 542 and 543 such that the amount of the adsorbent 61 existing in the moisture-adsorption space 541a is more than that of the adsorbent existing in the moisture-desorption space 541b. Specifically, a member bent in a L shape is used as each of the partition members 542 and 543, and thereby the moisture-adsorption space 541a is set approximately twice as large as the moisture-desorption space 541b in the accommodating space 541 of the adsorber 60. Note that the details of the adsorber 60 will be described later.

Returning to FIG. 1, the cold-air discharge portion 56 is a part that communicates with the moisture-adsorption space 541a of the adsorber accommodating portion 54 and discharges the air passing through the moisture-adsorption space 541a to the outside of the adsorption case 51. The cold-air discharge portion 56 in this embodiment is connected to a cold-air discharge duct (not shown).

The cold-air discharge duct is a duct that guides the air passing through the moisture-adsorption space 541a of the adsorption case 51 to the outside of the adsorption case 51. The cold-air discharge duct configures a moisture-adsorption side guiding portion, together with the cold-air discharge portion 56. The cold-air discharge duct has an outlet opening at its downstream end that is opened to the inside of the dashboard. In this way, the cold air flowing through the cold-air discharge duct is blown into the internal space of the dashboard.

A humidification blower 561 is disposed in the cold-air discharge portion 56 in this embodiment. The humidification blower 561 is provided to introduce the cooled air into the adsorption case 51 from the inside of the air-conditioning case 11 having a lower pressure, compared to the external pressure. The humidification blower 561 includes a humidification fan 561a, a humidification motor 561b, and the like.

The humidification fan 561a draws the air from the moisture-adsorption space 541a of the adsorber accommodating portion 54 and discharges the air therefrom. The humidification fan 561a in this embodiment is configured of a centrifugal fan that blows the air drawn thereinto from the axial direction toward the outside thereof in the radial direction. The humidification fan 561*a* is rotatably driven by the humidification motor 561*b*. Note that the humidification fan 561*a* is not limited to the centrifugal fan and may be configured of an axial fan, a cross flow fan, or the like.

The hot-air discharge portion 57 is a part that communicates with the moisture-desorption space 541*b* of the adsorption case 51 and discharges the air passing through the moisture-desorption space 541*b* to the outside of the adsorption case 51. The hot-air discharge portion 57 in this embodiment is connected to a humidification duct 571.

The humidification duct 571 is a duct that guides the humidification air, humidified in the moisture-desorption space 541*b* of the adsorption case 51, into the vehicle interior. The humidification duct configures a humidification side guiding portion, together with the hot-air discharge portion 57. The humidification duct 571 in this embodiment is a component separately formed from the air-conditioning duct 20, which is an outlet duct in the air-conditioning unit 10.

In the humidification duct 571, an outlet opening 572 as its downstream end is opened at a part (for example, a meter hood) located at the dashboard and near an occupant's face. The outlet opening 572 is opened in a position different from the outlet portion of the air-conditioning unit 10. Thus, the air flowing through the humidification duct is blown toward the occupant's face, thereby humidifying a space around the occupant's face.

In this embodiment, a duct having a flow-path diameter of φ50 mm and a flow-path length of approximately 1000 mm is adopted as the humidification duct 571. Thus, the high-temperature and high-humidity humidification air having passed through the adsorber 60 is cooled by exchanging heat with the air outside the humidification duct 571, thereby making it possible to increase the relative humidity of the humidification air.

Regarding the outlet opening 572 of the humidification duct 571, its opening diameter and its distance to the occupant's face are set such that the blown air therefrom reaches the face in a high-humidity state. The outlet opening 572 in this embodiment is set to have an opening diameter of approximately 75 mm and a distance to the occupant's face of approximately 600 mm in such a manner that the air reaching the face is at a relative humidity of approximately 40%, a temperature of approximately 20° C., and an air speed of approximately 0.5 m/s. That is, in this embodiment, the humidification duct 571 in use is a duct in which an opening area of the outlet opening 572 is larger than a flow-path cross section of the flow path leading to the outlet opening 572. In the humidification duct 571 configured in this way, the air speed reaching the occupant becomes low, so that the diffusion of the humidification air can be suppressed, thereby surely causing the humidification air to reach the face.

Furthermore, the humidification duct 571 in this embodiment is configured to be thinner than the cold-air suction duct 521 and the hot-air suction duct 531 in such a manner as to exchange heat between the air circulating through the duct 571 and the air existing outside the duct 571.

Here, a gas-gas heat exchanger 58 is disposed in the cold-air discharge portion 56 and hot-air discharge portion 57 in this embodiment. The gas-gas heat exchanger 58 exchanges heat between the air (i.e., cold air) passing through the moisture-adsorption space 541*a* of the adsorber accommodating portion 54 and the air (i.e., hot air) passing through the moisture-desorption space 541*b*.

Figure 5:
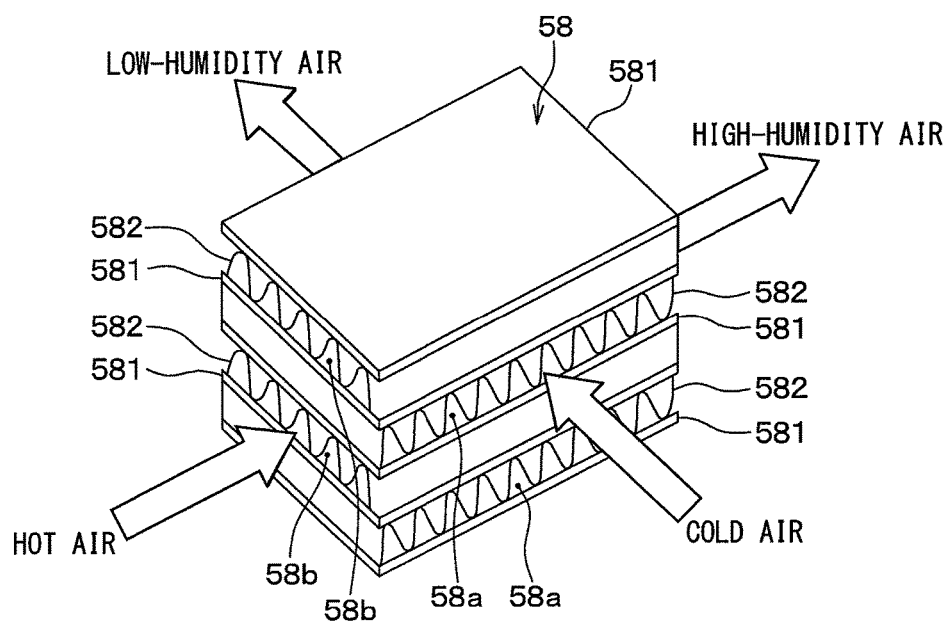
FIG. 5 is a perspective view showing an outline structure of a heat exchanger according to the first embodiment.

As shown in FIG. 5, the gas-gas heat exchanger 58 is a heat exchanger that includes a plurality of metal plate-shaped members 581 and fins 582 disposed between the adjacent plate-shaped members 581. The gas-gas heat exchanger 58 in this embodiment independently forms flow paths 58*a* for circulation of the cold air and flow paths 58*b* for circulation of the hot air so as not to mix the cold air and hot air therein. Note that materials for use in the plate shaped members 581 and the fins 582 are desirably formed of metal with excellent heat conductivity (e.g., aluminum, or copper).

Subsequently, the adsorber 60 will be described with reference to FIGS. 3 and 4. As shown in FIGS. 3 and 4, the adsorber 60 has a disk-shaped contour that corresponds to the inner shape of the adsorber accommodating portion 54. The adsorber 60 has its center part coupled to a rotary shaft 71 of a driving member 70 to be described later. The adsorber 60 is rotatably supported by the adsorption case 51 via the rotary shaft 71.

The adsorber 60 is configured to support the adsorbent 61 that adsorbs and desorbs (or releases) moisture into and from the metal plate-shaped members (not shown). The respective plate-shaped members are stacked on each other with a spacing therebeween so as to form a flow path between the adjacent plate-shaped members along the axial direction of the rotary shaft 71 to be described later. The adsorber 60 in this embodiment increases a contact area between the ventilation air and the adsorbent 61 by stacking the respective plate-shaped members that support the adsorbent 61.

The adsorbent 61 adopts a polymer sorbent. The adsorbent 61 preferably has adsorption property that changes the moisture amount adsorbed (i.e., the adsorption amount) by at least 3 wt % or more when changing the relative humidity of the ventilation air passing through the adsorber 60 by 50% within a temperature range expected as a temperature of the ventilation air. More preferably, the adsorbent 61 has the adsorption property that changes the adsorption amount thereof within a range of 3 wt % to 10 wt % under an environment on the same conditions as those described above.

The adsorber 60 in this embodiment is accommodated in the adsorber accommodating portion 54 that has its internal space partitioned into the moisture-adsorption space 541*a* and the moisture-desorption space 541*b*. Although the adsorber 60 is disposed to stride across both the moisture-adsorption space 541*a* and the moisture-desorption space 541*b* as mentioned above, there is a limitation on the adsorption amount of moisture that can be adsorbed in the adsorbent 61 existing in the moisture-adsorption space. Further, there is also a limitation on the amount of moisture desorbed by the adsorbent 61 existing in the moisture-desorption space 541*b*.

The humidification device 50 is provided with the driving member 70 that serves as a movement mechanism for moving the adsorbent 61 of the adsorber 60 between the moisture-adsorption space 541*a* and the moisture-desorption space 541*b*. The driving member 70 is a device that moves at least a part of the adsorbent 61 existing in the moisture-adsorption space 541*a* of the adsorber 60 to the moisture-desorption space 541*b*, while moving at least a part of the adsorbent 61 existing in the moisture-desorption space 541*b* of the adsorber 60 to the moisture-adsorption space 541*a*.

The driving member 70 is configured to include the rotary shaft 71 and an electric motor 72 with a decelerator. The rotary shaft 71 is coupled to the adsorber 60, while penetrating the center of the adsorber 60. The electric motor 72 serves to rotatably drive the rotary shaft 71. The rotary shaft 71 is rotatably supported by the adsorption case 51. The rotary shaft 71 rotates together with the adsorber 60 within the adsorption case 51 when receiving a driving force transferred thereto from the electric motor 72. Thus, a part of the adsorbent 61 existing in the moisture-desorption space 541*b* of the adsorber 60 moves to the moisture-adsorption space 541*a*, while a part of the adsorbent 61 existing in the moisture-adsorption space 541*a* of the adsorber 60 moves to the moisture-desorption space 541*b*.

The electric motor 72 in this embodiment serves to rotatably drive the rotary shaft 71 continuously in one direction. Thus, the adsorbent 61 that has sufficiently desorbed moisture at the moisture-desorption space 541*b* in the adsorber 60 can be moved to the moisture-adsorption space 541*a*, while the adsorbent 61 that has sufficiently adsorbed moisture at the moisture-adsorption space 541*a* in the adsorber 60 can be moved to the moisture-desorption space 541*b*.

Figure 6:
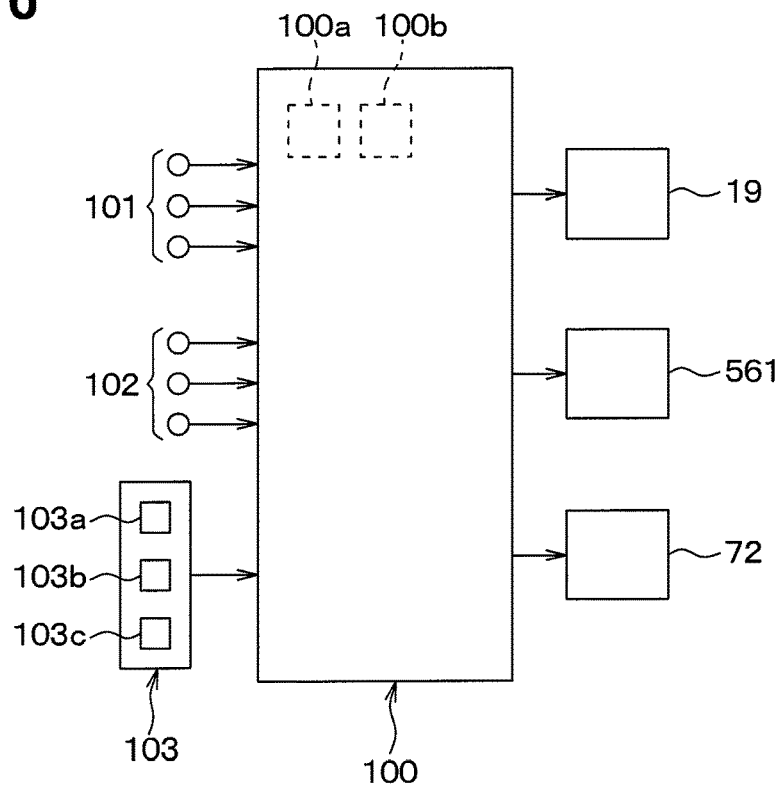
FIG. 6 is a block diagram showing the configuration of a controller for the humidification device and an air-conditioning unit according to the first embodiment.

Next, a controller 100 serving as an electric control unit for the vehicle air conditioner will be described with reference to FIG. 6. The controller 100 shown in FIG. 6 is configured of a microcomputer, including storage units, such as a CPU, a ROM, and a RAM, and a peripheral circuit thereof. The controller 100 performs various computations and processing based on control programs stored in the storage unit to thereby control the operations of various devices that are connected to its output side. Note that the storage unit in the controller 100 is configured of a non-transitional entity storage.

The controller 100 in this embodiment is a device obtained by integrally forming a control unit for controlling the operations of respective components of the air-conditioning unit 10 and a control unit for controlling the operations of respective components of the humidification device 50. Alternatively, the controller 100 may have a structure that separately includes the control unit for controlling the operations of respective components of the air-conditioning unit 10 and the control unit for controlling the operations of respective components of the humidification device 50.

The input side of the controller 100 is connected to a group 101 of various sensors for air-conditioning control, a group 102 of various sensors for humidification control, and an operation panel 103 for the air-conditioning control and the humidification control.

The group 101 of various sensors for air-conditioning control includes: an inside-air temperature sensor that detects an inside-air temperature; an outside-air temperature sensor that detects an outside-air temperature; a solar radiation sensor that detects the amount of solar radiation in the vehicle interior; and an evaporator temperature sensor that detects the temperature of the evaporator 13.

The group 102 of various sensors for the humidification control includes a first temperature sensor that detects the temperature of air blown from the humidification duct 571 and a second temperature sensor that detects the temperature of air blown from the cold-air discharge duct.

The operation panel 103 is provided with an air-conditioning operation switch 103*a*, a humidification operation switch 103*b*, a temperature setting switch 103*c*, and the like. The air-conditioning operation switch 103*a* is a switch that switches between on and off of an air-conditioning operation by the air-conditioning unit 10. The humidification operation switch 103*b* is a switch that switches between on and off of a humidification operation of the humidification device 50. The temperature setting switch 103*c* is a switch that presets a target temperature of air blown out of the air-conditioning unit 10 or the humidification device 50.

The controller 100 in this embodiment is a device that integrates therein hardware and software of the control units for controlling the operations of various components connected to its output side. The control units integrated in the controller 100 include a humidification control unit 100*a* and a desorption control unit 100*b*. The humidification control unit 100*a* executes a humidification process for humidifying the vehicle interior by the humidification device 50. The desorption control unit 100*b* executes a desorption process for desorbing moisture, adsorbed in the adsorbent 61, when stopping the humidification of the vehicle interior.

Next, the operations of the air-conditioning unit 10 and the humidification device 50 in this embodiment will be described. First, the outline of the operation of the air-conditioning unit 10 will be described. In the air-conditioning unit 10, when the air-conditioning operation switch 103*a* is turned on, the controller 100 calculates a target air outlet temperature TAO of the ventilation air to be blown into the vehicle interior, based on detection signals from the group 101 of the respective sensors for the air-conditioning control and the preset temperature set by the temperature setting switch 103*c*. The controller 100 controls the operations of the respective components in the air-conditioning unit 10 such that the temperature of the ventilation air to be blown into the vehicle interior approaches the target air outlet temperature TAO.

In this way, the controller 100 in the air-conditioning unit 10 controls the respective components according to the detection signals or the like from the group 101 of the respective sensors for the air-conditioning control, thereby making it possible to achieve the appropriate temperature adjustment of the vehicle interior requested by the user.

Subsequently, the operation of the humidification device 50 will be described below with reference to the flowchart of FIG. 7. The controller 100 executes control processing when the air-conditioning operation switch 103*a* is turned on as shown in the flowchart of FIG. 7.

Figure 7:
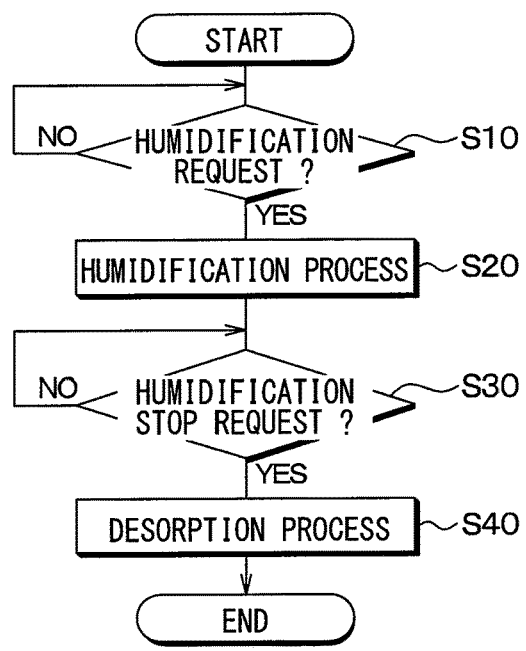
FIG. 7 is a flowchart showing the flow of control processing of the humidification device executed by the controller according to the first embodiment.

As shown in FIG. 7, the controller 100 determines whether a humidification request is made or not by detecting on or off of the humidification operation switch 103*b* (S10). In the determination process at step S10, the humidification request is determined not to be made when the humidification operation switch 103*b* is turned off, whereas the humidification request is determined to be made when the humidification operation switch 103*b* is turned on.

When the humidification request is determined to be made as a result of the determination process at step S10, the controller 100 executes the humidification process of the vehicle interior by using the humidification device 50 (S20). Specifically, the controller 100 operates the driving member 70 while operating the humidification blower 561, thereby rotating the adsorber 60 at a predetermined rotational speed (for example, 5 rpm). Note that when the air mix door 18 is located in a position that closes the hot-air passage 16, the controller 100 causes the air mix door 18 to be displaced to a position that opens the hot-air passage 16 (for example, an intermediate position).

At this time, the controller 100 controls the humidification blower 561 such that when the reference air volume is defined as the minimum air volume from the air-conditioning blower 19, the air volume of the cooled air introduced via the cold-air suction duct 521 is smaller (for example, at 20 m$^3$/h, which is approximately 20% of the reference air volume) than the reference air volume.

In this case, the cooled air introduced via the cold-air suction duct 521 is sufficiently smaller than the reference air volume, which hardly affects an air-conditioning function of the side of the air-conditioning unit 10. Note that the controller 100 may be adapted to control the air volume of the air-conditioning blower 19 based on the detection values and the like from the group 102 of the respective sensors for the humidification control.

The controller 100 controls the electric motor 72 of the driving member 70 in such a manner that the adsorbent 61, which has sufficiently desorbed moisture in the moisture-desorption space 541*b*, moves to the moisture-adsorption space 541*a* of the adsorber accommodating portion 54. For example, the controller 100 controls the electric motor 72 such that when a reference time is defined as a time required to desorb moisture from the adsorbent 61 in the moisture-desorption space 541*b*, the adsorbent 61 is moved to the moisture-adsorption space 541*a* after the reference time has elapsed since the movement of the adsorbent 61 to the moisture-desorption space 541*b*.

Figure 8:
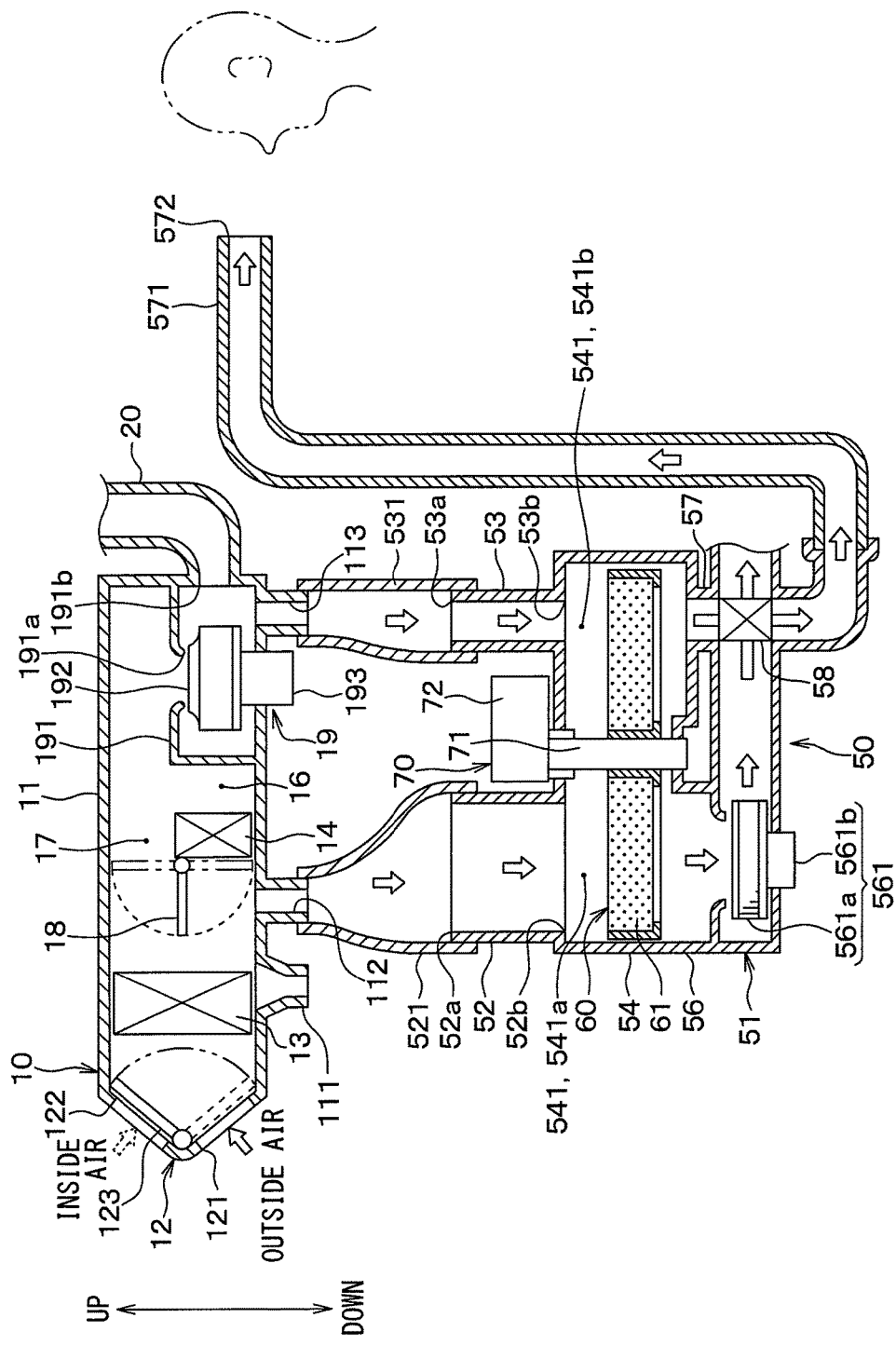
FIG. 8 is a schematic cross-sectional view showing an operating state of the humidification device and air-conditioning unit according to the first embodiment.

Here, a description will be given on the operating state of the humidification device 50 when the controller 100 executes the humidification process with reference to FIG. 8. As shown in FIG. 8, part of the low-temperature and high-humidity cooled air (for example, at a temperature of 5° C. and a relative humidity of 70%), cooled by the evaporator 13, is introduced into the adsorption case 51 via the cold-air suction duct 521. The moisture contained in the cooled air introduced into the adsorption case 51 is adsorbed into the adsorbent 61 existing in the moisture-adsorption space 541*a* of the adsorber 60.

At this time, since the adsorber 60 rotates within the accommodating space 541, the adsorbent 61, which has sufficiently desorbed moisture in the moisture-desorption space 541*b* of the adsorber 60, moves to the moisture-adsorption space 541*a*. Thus, the moisture contained in the cooled air introduced into the adsorption case 51 is continuously adsorbed into the adsorbent 61 existing in the moisture-adsorption space 541*a* of the adsorber 60.

Subsequently, the air passing through the moisture-adsorption space 541*a* flows to the cold-air discharge duct via the cold-air discharge portion 56 and is then blown into the internal space of the dashboard. Thus, the cold air at a low humidity hardly flows into the vehicle interior.

Part of the high-temperature and low-humidity heated air (for example, at a temperature of 25° C. and a relative humidity of 20%), heated by the heater core 14, is introduced into the adsorption case 51 via the hot-air suction duct 531. Moisture adsorbed in the adsorbent 61 is desorbed therefrom within the moisture-desorption space 541*b* in the adsorber 60, and then the heated air introduced into the adsorption case 51 is humidified (for example, at a temperature of 21° C. and a relative humidity of 57%) with the desorbed moisture.

At this time, since the adsorber 60 rotates within the accommodating space 541, the adsorbent 61, which has sufficiently adsorbed moisture in the moisture-adsorption space 541*a* of the adsorber 60, moves to the moisture-desorption space 541*b*. Thus, the heated air introduced into the adsorption case 51 is continuously humidified by the moisture desorbed from the adsorbent 61 existing in the moisture-adsorption space 541*a* of the adsorber 60.

Here, in this embodiment, the hot-air suction duct 531 is connected to an air-discharge side of the air-conditioning blower 19 that becomes at a higher pressure than the pressure in the adsorption case 51. Thus, heated air produced by the heater core 14 is introduced into the adsorption case 51 via the hot-air suction duct 531 by a difference in pressure between the air-discharge side of the air-conditioning blower 19 and the adsorption case 51.

Subsequently, the humidification air, humidified in the moisture-desorption space 541*b*, flows through the hot-air discharge portion 57. The humidification air flowing through the hot-air discharge portion 57 exchanges heat with the cooled air flowing through the cold-air discharge portion 56 in the gas-gas heat exchanger 58, and thereby the air is cooled and decreases its temperature while increasing its relative humidity (for example, at a temperature of 18° C. and a relative humidity of 65%). The humidification air having passed through the gas-gas heat exchanger 58 is blown from the outlet opening 572 toward the occupant's face via the humidification duct 571.

Returning to FIG. 7, the controller 100 determines whether a humidification stop request is made or not during execution of the above-mentioned humidification process (S30). In the determination process at step S30, the humidification stop request is determined not to be made when each of the operation switches 103*a* and 103*b* is turned on, whereas the humidification stop request is determined to be made when either of the operation switches 103*a* and 103*b* is turned off.

When the humidification stop request is determined not to be made as a result of the determination process at step S30, the controller 100 continues the humidification process.

On the other hand, when the humidification stop request is determined to be made as a result of the determination process at step S30, the controller 100 executes the desorption process of desorbing moisture adsorbed in the adsorbent 61 of the adsorber 60 (S40).

Specifically, the controller 100 stops the operation of the humidification blower 561 while rotating the adsorber 60 by the driving member 70 during execution of the desorption process.

Thus, the low-temperature and high-humidity cooled air produced by the evaporator 13 does not flow into the adsorption case 51 by stopping of the operation of the humidification blower 561, thereby stopping the adsorption of moisture in the adsorbent 61 existing in the moisture-adsorption space 541*a* of the adsorber 60.

On the other hand, the heated air at a high temperature and a low humidity, produced by the heater core 14, is introduced into the adsorption case 51 via the hot-air suction duct 531, and the moisture adsorbed in the adsorbent 61 existing in the moisture-desorption space 541*b* of the adsorber 60 is desorbed from the adsorbent 61.

In this way, the adsorption of the moisture in the adsorbent 61 of the moisture-adsorption space 541*a* is stopped, and the desorption of the moisture from the adsorbent 61 in the moisture-desorption space 541*b* is continued, so that the moisture adsorbed in the adsorbent 61 can be desorbed therefrom.

The controller 100 continues the desorption process until a preset process duration has elapsed. After the time has elapsed since the start of the desorption process, the controller 100 stops the operations of the respective components of the humidification device 50 and ends the control processing. Note that the process duration only needs to be set at a time required to cause the humidification device 50 to desorb the whole moisture adsorbed in the adsorbent 61 existing in the moisture-desorption space 541*b*.

The humidification device 50 in this embodiment described above and the vehicle air conditioner including the humidification device 50 can use the moisture of the cooled air produced by the air-conditioning unit 10 to humidify the vehicle interior, which eliminates the need to supply water from the outside to the vehicle air conditioner. Note that this embodiment utilizes the heated air produced by the air-conditioning unit 10 and thereby does not need to prepare a heat source dedicated to the humidification.

Within the air-conditioning case 11, air having a higher relative humidity in the cooled air produced by the evaporator 13 has a higher specific gravity than that of air having a lower relative humidity, and thereby tends to flow along the bottom surface portion 11a of the air-conditioning case 11.

In the humidification device 50 and the vehicle air conditioner of this embodiment, a cold-air suction duct 521 to introduce the cooled air produced by the evaporator 13 into the adsorption case 51 is connected to the bottom surface portion 11a of the air-conditioning case 11 on the air-flow downstream side of the evaporator 13 in the air-conditioning case 11.

Thus, the cooled air at a low temperature and a comparatively high relative humidity inside the air-conditioning case 11 is introduced into the adsorption case 51, so that the adsorption amount of moisture into the adsorbent 61 can be sufficiently ensured.

Therefore, the humidification device 50 and the vehicle air conditioner including the humidification device 50 in this embodiment can efficiently humidify the vehicle interior without being supplied with water from the outside.

Here, with a structure that guides the cooled air produced by the evaporator 13 provided in the air-conditioning unit 10 to the inside of the adsorption case 51, the condensed water generated in the evaporator 13 might possibly be introduced into the adsorption case 51, together with the cooled air. The condensed water generated in the evaporator 13 occasionally contains impurities, such as bacteria. Once the condensed water is adsorbed in the adsorbent 61, mold might be generated in the adsorbent 61, and the adsorbent 61 itself might become a source of bad smell.

In this embodiment, the cold-air suction duct 521 configuring a first introduction portion is connected to the bottom surface portion 11a on the air-flow downstream side of the drain discharge portion 111 which is formed under the evaporator 13 in the air-conditioning case 11.

In this way, the cold-air suction duct 521 configuring the first introduction portion is connected to the bottom surface portion 11a on the air-flow downstream side of the drain discharge portion in the air-conditioning case 11. Such an arrangement can prevent the adsorbent 61 from being covered with the condensed water generated in the evaporator 13. As a result, the comfort for the occupant can be improved because of the humidification of the vehicle interior.

The humidification device 50 in this embodiment includes the driving member 70. The driving member 70 moves a part of the adsorbent 61 existing in the moisture-adsorption space 541a of the adsorber 60 to the moisture-desorption space 541b, while moving a part of the adsorbent 61 existing in the moisture-desorption space 541b of the adsorber 60 to the moisture-adsorption space 541a.

Thus, the moisture adsorbed into the adsorbent 61 in the moisture-adsorption space 541a can be desorbed from the adsorbent in the moisture-desorption space 541b, thereby humidifying the heated air with the moisture. Concurrently, the adsorbent 61 desorbing the moisture in the moisture-desorption space 541b can adsorb the moisture of the cooled air circulating through the moisture-adsorption space 541a.

Therefore, the humidification device 50 and the vehicle air conditioner in this embodiment can achieve the continuous humidification of the vehicle interior without being supplied with water.

In the humidification device 50 of this embodiment, the humidification duct 571 configuring a humidification-side guiding portion is a component separately formed from the air-conditioning duct 20 for the air having its temperature adjusted in the air-conditioning unit 10. With this arrangement, the air having its temperature adjusted in the air-conditioning unit 10 is less likely to be mixed with the humidification air, humidified by the humidification device 50, so that the humidification air at a high humidity can be supplied to the vehicle interior.

Furthermore, in this embodiment, the adsorption case 51, the cold-air suction duct 521, and the hot-air suction duct 531 are components separately formed from the air-conditioning case 11. The cold-air suction duct 521 and the hot-air suction duct 531 are configured to be detachable from the air-conditioning case 11.

Thus, the humidification device 50 can be additionally installed on the air-conditioning unit 10. That is, the humidification device 50 can be set as an option (i.e., add-on part) for the vehicle air conditioner.

In addition, in this embodiment, the gas-gas heat exchanger 58 is provided to exchange heat between the cooled air passing through the moisture-adsorption space 541a and the humidification air passing through the moisture-desorption space 541b. Thus, the gas-gas heat exchanger 58 cools the air having passed through the moisture-desorption space 541b by using the air (i.e., cooled air) having passed through the moisture-adsorption space 541a, so that the humidification air guided out to the vehicle interior can have a high relative humidity. As a result, the comfort for the occupant can be improved because of the humidification of the vehicle interior.

In this embodiment, the controller 100 executes the desorption process that desorbs moisture, adsorbed in the adsorbent 61, when stopping the humidification of the vehicle interior. Thus, breeding of germs in the presence of moisture remaining in the adsorbent 61 can be suppressed during stopping the humidification device 50, thereby ensuring the comfort for the occupant because of the humidification of the vehicle interior.

Here, the adsorption rate of moisture per unit mass into the adsorbent 61 tends to be approximately slower than the desorption rate of moisture per unit mass from the adsorbent 61.

When taking this into account, in this embodiment, the accommodating space within the adsorption case 51 is partitioned by the respective partition members 542 and 543 such that the amount of the adsorbent 61 existing in the moisture-adsorption space 541a is more than that of the adsorbent 61 existing in the moisture-desorption space 541b.

Thus, the adsorption amount of moisture into the adsorbent 61 can be sufficiently ensured in the moisture-adsorption space 541a, thereby making it possible to efficiently desorb the moisture, adsorbed into the adsorbent 61, in the moisture-desorption space 541b, ensuring the sufficient humidification amount.

Although this embodiment describes an example in which the humidification device 50 is disposed on a lower side of the air-conditioning unit 10, the present disclosure is not limited thereto. For example, the humidification device 50 may be disposed above or beside the air-conditioning unit 10.

Second Embodiment

Next, a second embodiment will be described with reference to FIG. 9.

This embodiment differs from the first embodiment in that the humidification device 50 is applied to an air-conditioning unit 10A in which an air-conditioning blower 19A is disposed on the air-flow upstream side of the evaporator 13. In this embodiment, the description of the same or equivalent parts or the like as those in the first embodiment will be omitted or simplified.

Figure 9:
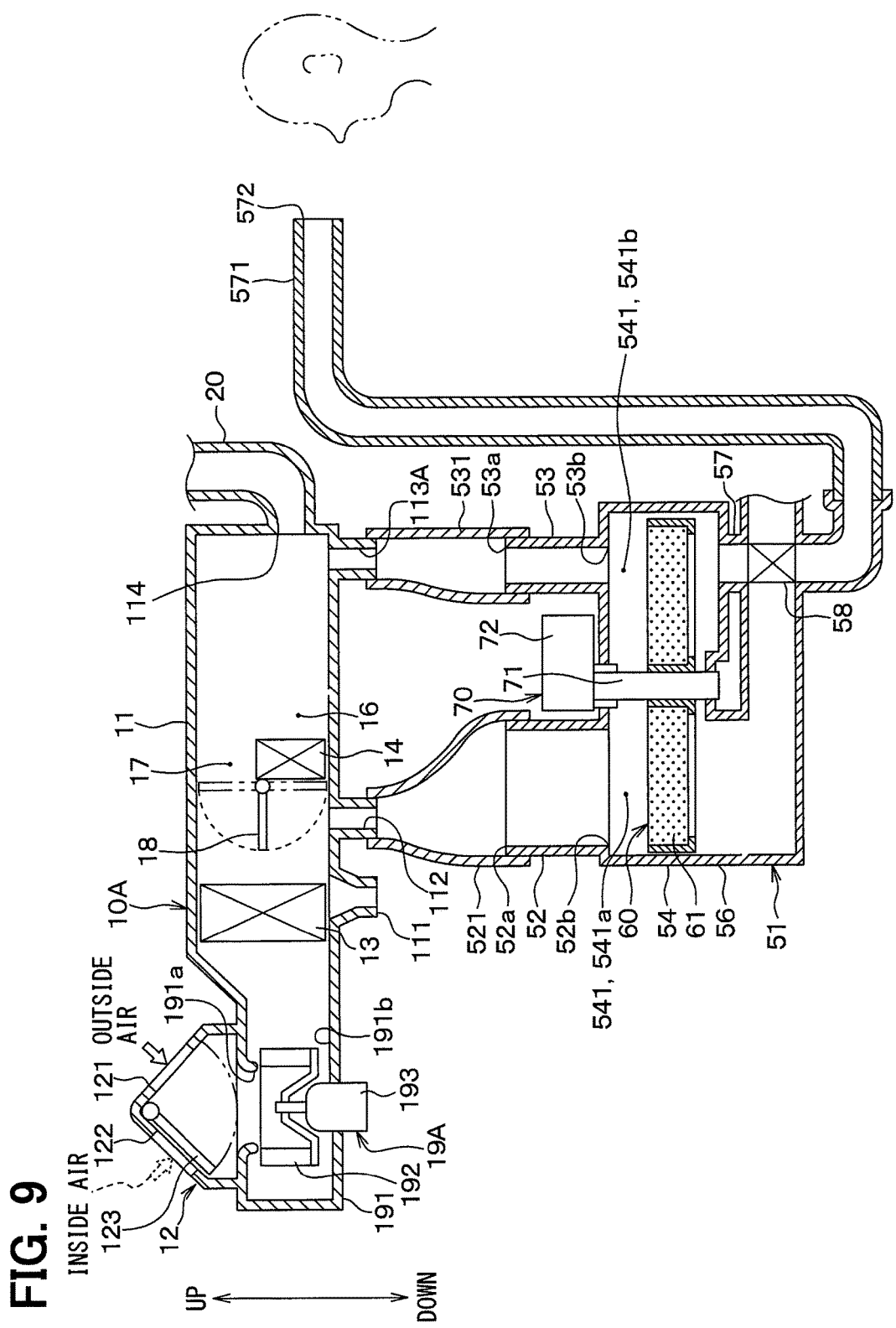
FIG. 9 is a schematic cross-sectional view showing an entire structure of a vehicle air conditioner that includes a humidification device according to a second embodiment.

As shown in FIG. 9, in the air-conditioning unit 10A of this embodiment, the air-conditioning blower 19A is disposed on the air-flow downstream side of the inside/outside air switching box 12 and on the air-flow upstream side of the evaporator 13. In the air-conditioning blower 19A of this embodiment, the suction port 191a is opened toward the inside/outside air switching box 12, while the discharge port 191b is opened toward the evaporator 13.

A hot-air guiding portion 113A in this embodiment is formed on the air-flow downstream side of the heater core 14 at the bottom surface portion 11a of the air-conditioning case 11. Note that the hot-air guiding portion 113A in this embodiment only needs to be located on the air-flow downstream side of the heater core 14, for example, may be formed in the air-conditioning duct 20 of the air-conditioning case 11.

Furthermore, the air-conditioning case 11 in this embodiment has an opening 114 formed on the air-flow downstream side of the heater core 14. The opening 114 is to blow the temperature-adjusted air from the air-conditioning case 11 into the vehicle interior via the air-conditioning duct 20 and the outlet portions.

Other structures in the air-conditioning unit 10A are substantially the same as those in the first embodiment. The air-conditioning unit 10A in this embodiment adopts a so-called push-type structure in which the air-conditioning blower 19A is disposed on the air-flow upstream side of the evaporator 13.

Thus, the pressure in the air-conditioning case 11, located after the discharge side of the air-conditioning blower 19A, is higher than the pressure outside the air-conditioning case 11.

Subsequently, the humidification device 50 in this embodiment will be described below. In the humidification device 50 of this embodiment, each of the suction ducts 521 and 531 is connected to the air discharge side of the air-conditioning blower 19A that becomes at a higher pressure than the pressure in the adsorption case 51.

Thus, part of the cooled air produced by the evaporator 13 is introduced into the adsorption case 51 via the cold-air suction duct 521 by a difference in pressure between the air-discharge side of the air-conditioning blower 19 and the adsorption case 51. Likewise, part of the heated air produced by the heater core 14 is introduced into the adsorption case 51 via the hot-air suction duct 531.

In this way, in this embodiment, the cooled air and heated air are introduced into the adsorption case 51 via the respective suction ducts 521 and 531 by the difference in pressure between the air-discharge side of the air-conditioning blower 19 and the adsorption case 51. Thus, the humidification device 50 in this embodiment eliminates a structure corresponding to the humidification blower 561 in the first embodiment.

Other structures in this embodiment are the same as those in the first embodiment. Also with the arrangement of this embodiment, the moisture of the cooled air produced by the air-conditioning unit 10A can be used to humidify the vehicle interior, which eliminates the need to supply water from the outside to the vehicle air conditioner. The cold-air suction duct 521 is connected to the bottom surface portion 11a of the air-conditioning case 11 on the air-flow downstream side of the evaporator 13 in the air-conditioning case 11. Thus, the cooled air at a low temperature and a comparatively high relative humidity inside the air-conditioning case 11 is introduced into the adsorption case 51, so that the adsorption amount of moisture into the adsorbent 61 can be sufficiently ensured.

Therefore, the humidification device 50 and the vehicle air conditioner in this embodiment can efficiently humidify the vehicle interior without being supplied with water from the outside.

In particular, the humidification device 50 in this embodiment eliminates a structure corresponding to the humidification blower 561 in the first embodiment. Thus, this arrangement has an advantage of enabling the reduction in the number of parts of the humidification device 50.

It should be noted that in the structure that introduces part of the cooled air produced by the evaporator 13 into the adsorption case 51 via the cold-air suction duct 521, like this embodiment, the moisture in the adsorbent 61 is difficult to desorb sufficiently by the desorption process when stopping the operation of the humidification device 50. For this reason, desirably, this embodiment additionally has an interruption member that temporarily interrupts the introduction of the cooled air produced by the evaporator 13 into the adsorption case 51. The interruption member may be configured, for example, of an opening/closing door that opens or closes the first external introduction port 52a.

Third Embodiment

Next, a third embodiment will be described with reference to FIG. 10. This embodiment differs from the first embodiment in that a discharge route for the air passing through the moisture-adsorption space 541a of the adsorption case 51 is modified. In this embodiment, the description of the same or equivalent parts or the like as those in the first embodiment will be omitted or simplified.

Figure 10:
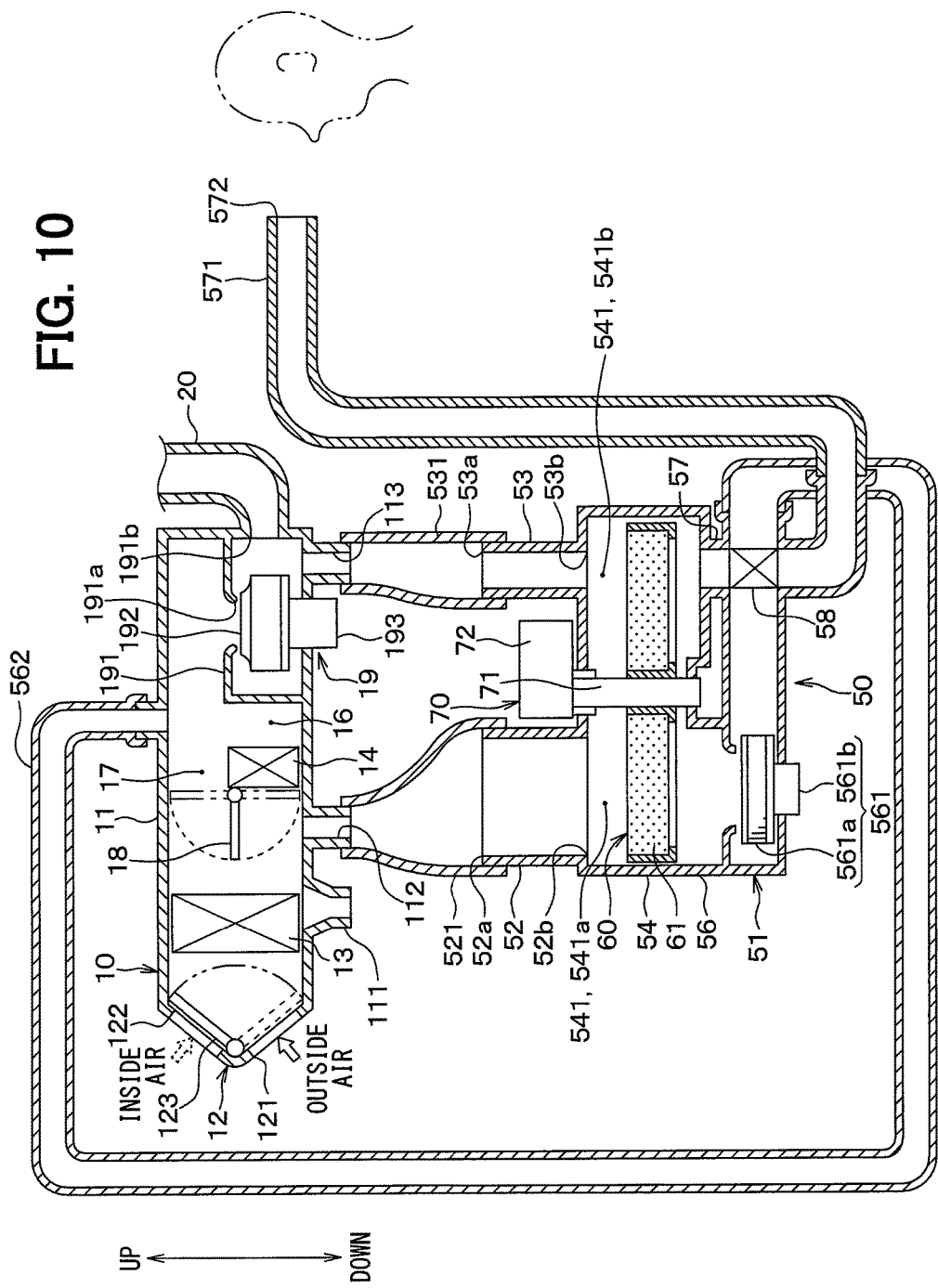
FIG. 10 is a schematic cross-sectional view showing an entire structure of a vehicle air conditioner that includes a humidification device according to a third embodiment.

As shown in FIG. 10, in this embodiment, the air-conditioning case 11 is connected to an opening as the downstream-side end of a cold-air discharge duct 562 so as to allow the air having passed through the moisture-adsorption space 541a to be discharged toward the outside. In this embodiment, the cold-air discharge duct 562 is connected to the air-conditioning case 11 such that the air flowing through the cold-air discharge duct 562 is returned to the cold-air bypass passage 17. Note that a part of the connection of the cold-air discharge duct 562 is not limited thereto, and can be connected to an arbitrary part in the air-conditioning case 11.

Other structures in this embodiment are the same as those in the first embodiment. Also with the arrangement of this embodiment, the moisture of the cooled air produced by the air-conditioning unit 10 can be used to humidify the vehicle interior, which eliminates the need to supply water from the outside to the vehicle air conditioner. The cold-air suction duct 521 is connected to the bottom surface portion 11a of the air-conditioning case 11 on the air-flow downstream side of the evaporator 13 in the air-conditioning case 11. Thus, the cooled air at a low temperature and a comparatively high relative humidity inside the air-conditioning case 11 is introduced into the adsorption case 51, so that the adsorption amount of moisture into the adsorbent 61 can be sufficiently ensured.

Therefore, the humidification device 50 and the vehicle air conditioner in this embodiment can efficiently humidify the vehicle interior without being supplied with water from the outside.

In particular, the humidification device 50 in this embodiment is configured such that the downstream-side end of the cold-air discharge duct 562 configuring the moisture-adsorption side guiding portion is connected to the air-conditioning case 11, and that the cooled air having passed through the moisture-adsorption space 541a is guided into the air-conditioning case 11. Thus, the air having passed through the moisture-adsorption space 541a is returned to the air-conditioning case 11, which has an advantage of enabling the suppression of the leakage of low-humidity air into the vehicle interior.

Other Embodiments

Although the embodiments of the present disclosure have been described above, the present disclosure is not limited to the above-mentioned embodiments. Various modifications can be made thereto, for example, as follows.

(1) Although each of the above-mentioned embodiments has described an example in which the humidification device 50 is applied to the air-conditioning unit 10 or 10A that cools the ventilation air by the evaporator 13 and heats the ventilation air by the heater core 14, the present disclosure is not limited thereto. For example, the humidification device 50 may be applied to the air-conditioning units 10 and 10A that adopt a cooling member, such as a Peltier element, as a cooling portion for cooling the ventilation air, or to the air-conditioning units 10 and 10A that adopt an electric heater or a radiator of a refrigeration cycle as a heating portion for heating the ventilation air.

(2) Although each of the above-mentioned embodiments has described an example in which the hot-air suction duct 531 of the humidification device 50 is connected to the hot-air guiding portion 113 that is opened at the bottom surface portion 11a of the air-conditioning case 11, the present disclosure is not limited thereto. For example, the hot-air suction duct 531 may be connected to the hot-air guiding portion 113 provided at the upper surface portion 11b or the side surface portions 11c of the air-conditioning case 11.

Here, the heated air produced by the heater core 14 is blown into the vehicle interior. To this end, the hot-air suction duct 531 may be connected to an opening that communicates with the vehicle interior, and the inside air may be introduced into the adsorption case 51 as the heated air produced by the heater core 14. That is, the low-humidity and high-temperature air exists in the vehicle interior into which the heated air produced by the air-conditioning units 10 and 10A is blown, compared to the cooled air produced by the evaporator 13. For this reason, the inside air may be introduced into the adsorption case 51 as the heated air produced by the heater core 14

(3) Although each of the above-mentioned embodiments has described an example in which the adsorption case 51 is connected to the air-conditioning case 11 via the respective suction ducts 521 and 531, the present disclosure is not limited thereto. For example, the cold-air suction portion 52 and the hot-air suction portion 53 in the adsorption case 51 may be directly connected to the air-conditioning case 11. In this case, the cold-air suction portion 52 configures a first introduction portion, while the hot-air suction portion 53 configures a second introduction portion.

(4) Each of the above-mentioned embodiments has described an example in which the accommodating space 541 is partitioned such that the amount of the adsorbent 61 existing in the moisture-adsorption space 541a is less than that of the adsorbent 61 existing in the moisture-desorption space 541b when taking into account a difference between the adsorption rate and desorption rate of the adsorbent 61. However, the present disclosure is not limited thereto.

For example, the volume of the cooled air circulating through the moisture-adsorption space 541a may be set larger than that of the heated air circulating through the moisture-desorption space 541b. With this arrangement, the adsorption amount of moisture into the adsorbent 61 in the moisture-adsorption space 541a can be sufficiently ensured, even when the amount of the adsorbent 61 existing in the moisture-adsorption space 541a is substantially equal to that of the adsorbent 61 existing in the moisture-desorption space 541b.

(5) Although each of the above-mentioned embodiments has described an example of a structure in which the adsorbent 61 is supported by a plurality of metal plate-shaped members as the adsorber 60, the present disclosure is not limited thereto. The adsorber 60 may be configured to support the adsorbent 61 in a structure body, for example, having a honeycomb structure.

(6) Although each of the above-mentioned embodiments has described an example in which a polymer sorbent is adopted as the adsorbent 61, the present disclosure is not limited thereto. Examples of the adsorbent 61 suitable for use may include silica gel and zeolite.

(7) Each of the above-mentioned embodiments has described an example in which the adsorber 60 is continuously rotated in one direction by the electric motor 72 of the driving member 70, causing the adsorbent 61 of the adsorber 60 to move between the moisture-adsorption space 541a and the moisture-desorption space 541b. However, the present disclosure is not limited thereto.

For example, the adsorber 60 may be intermittently rotated in one direction by the electric motor 72 of the driving member 70, causing the adsorbent 61 of the adsorber 60 to move between the moisture-adsorption space 541a and the moisture-desorption space 541b.

The rotational direction of the adsorber 60 by the electric motor 72 of the driving member 70 is not limited to one direction, and may be an inverse direction relative to the one direction. For example, the rotational direction of the adsorber 60 may be switched between the one direction and the inverse direction relative to the one direction at a predetermined time interval, thereby moving the adsorbent 61 of the adsorber 60 between the moisture-adsorption space 541a and the moisture-desorption space 541b.

When the accommodating space 541 is partitioned such that the moisture-adsorption space 541a has substantially the same size as the moisture-desorption space 541b or the like, switching may be performed between the whole adsorbent 61 existing in the moisture-adsorption space 541a and the whole adsorbent 61 existing in the moisture-desorption space 541b. In this case, the adsorber 60 may be intermittently rotated by 180° by the driving member 70.

(8) Although each of the above-mentioned embodiments has described an example in which the driving member 70 for rotating the adsorber 60 is adopted as a moving mechanism that moves the adsorbent 61 of the adsorber 60 between the moisture-adsorption space 541a and the moisture-desorption space 541b, the present disclosure is not limited thereto. For example, the adsorber 60 may be configured of a plurality of adsorption portions, and a structure may be adopted as a moving mechanism to move each adsorption portion in a slide manner between the moisture-adsorption space 541a and the moisture-desorption space 541b.

(9) Each of the above-mentioned embodiments has described an example in which the adsorbent 61 of the adsorber 60 is moved between the moisture-adsorption space 541a and the moisture-desorption space 541b, thereby achieving the continuous humidification in the vehicle interior by using the humidification device 50. However, the present disclosure is not limited thereto.

The humidification device 50 may be provided, for example, with a switching mechanism that switches between a circulation route for the cooled air to the adsorption case 51 and a circulation route for the heated air thereto. The switching mechanism may be configured to switch each circulation route at a predetermined time interval. In this way, the circulation routes for the cooled air and for the heated air are switched each other, making it possible to achieve the continuous humidification of the vehicle interior.

(10) Like each of the above-mentioned embodiments, the humidification device 50 is desirably one capable of continuously humidifying the vehicle interior. However, the present disclosure is not limited thereto. The humidification device 50 may be configured, for example, to introduce the cooled air into the adsorption case 51, thereby adsorbing the moisture into the adsorbent 61 of the adsorber 60, then to introduce the heated air into the adsorption case 51, thereby desorbing the moisture from the adsorbent 61 of the adsorber 60, and eventually to generate the humidification air humidified with the desorbed moisture. Thus, the humidification of the vehicle interior becomes intermittent, but the humidification can be achieved without any supply of water.

(11) Like each of the above-mentioned embodiments, the humidification duct 571 configuring a humidification-side guiding portion is desirably a component separately formed from the air-conditioning duct 20 for the air having its temperature adjusted in the air-conditioning unit 10. However, the present disclosure is not limited thereto. For example, the humidification duct 571 may be a component that is integral with the air-conditioning duct 20 on the side of the air-conditioning unit 10.

(12) Like each of the above-mentioned embodiments, the adsorption case 51 and the respective suction ducts 521 and 531 are desirably components separately formed from the air-conditioning case 11, and the respective suction ducts 521 and 531 are configured to be detachable from the air-conditioning case 11. However, the present disclosure is not limited thereto. For example, the adsorption case 51 and the respective suction ducts 521 and 531 may be components integral with the air-conditioning case 11.

(13) Like each of the above-mentioned embodiments, the gas-gas heat exchanger 58 is desirably provided to exchange heat between the cooled air passing through the moisture-adsorption space 541a and the humidification air passing through the moisture-desorption space 541b. However, the present disclosure is not limited thereto. For example, the gas-gas heat exchanger 58 may be omitted.

(14) Like each of the above-mentioned embodiments, the desorption process that desorbs moisture, adsorbed in the adsorbent 61, is desirably executed when stopping the humidification of the vehicle interior. However, the present disclosure is not limited thereto, and no desorption process may be executed.

(15) It is obvious that in each of the above-mentioned embodiments, elements constituting the embodiments are not necessarily essential particularly unless otherwise specified and except when clearly considered to be essential in principle, and the like. Note that the elements constituting the respective embodiments can be appropriately combined to the greatest extent practicable.

(16) When referring to a specific number about a component, including the number, a numerical value, an amount, a range, and the like in each of the above-mentioned embodiments, the component should not be limited to the specific number particularly except when clearly determined to be essential, and except when obviously limited to the specific number in principle, and the like.

(17) When referring to the shape, positional relationship, etc., of a component or the like in each of the above-mentioned embodiments, the component should not be limited to the shape, positional relationship, or the like unless otherwise specified and except when limited to the specific shape, positional relationship, etc., in principle, and the like.

What is claimed is:

1. A humidification device to be used for an air-conditioning unit, the air-conditioning unit being configured to accommodate a cooling portion that cools ventilation air and a heating portion that heats the ventilation air in an air-conditioning case that forms a ventilation passage for the ventilation air into a vehicle interior, the humidification device comprising:
   an adsorber including an adsorbent that adsorbs and desorbs moisture;
   an adsorption case that defines an accommodating space to accommodate the adsorber;
   a first introduction portion that introduces cooled air produced by the cooling portion into the adsorption case as air that causes moisture to be adsorbed into the adsorbent;
   a second introduction portion that introduces heated air produced by the heating portion into the adsorption case as air that causes the moisture adsorbed in the adsorbent to be desorbed from the adsorbent; and
   a humidification-side guiding portion that guides humidification air humidified by the moisture desorbed within the adsorption case to the vehicle interior, wherein
   the first introduction portion is connected to a bottom surface portion of the air-conditioning case on an air-flow downstream side of the cooling portion in the air-conditioning case.

2. The humidification device according to claim 1, wherein
   the humidification-side guiding portion includes a component separately formed from an outlet duct.

3. The humidification device according to claim 1, wherein
   the adsorption case, the first introduction portion, and the second introduction portion are components separately formed from the air-conditioning case, and
   the first introduction portion and the second introduction portion are configured to be detachable from the air-conditioning case.

4. The humidification device according to claim 1, further comprising:
   a moving mechanism that moves the adsorbent within the adsorption case, wherein
   a moisture-adsorption space and a moisture-desorption space are set as the accommodating space in the adsorption case, the moisture-adsorption space being adapted to circulate the cooled air produced by the cooling portion and to adsorb moisture, contained in the cooled air, into the adsorbent, the moisture-desorption space being adapted to circulate the heated air produced by the heating portion and to desorb moisture, adsorbed in the adsorbent, from the adsorbent, and
   the moving mechanism moves at least a part of the adsorbent existing in the moisture-desorption space of the adsorber to the moisture-adsorption space, while moving at least part of the adsorbent existing in the moisture-adsorption space of the adsorber to the moisture-desorption space.

5. The humidification device according to claim 4, further comprising:
a heat exchanger that exchanges heat between air passing through the moisture-adsorption space and air passing through the moisture-desorption space.

6. The humidification device according to claim 4, further comprising:
a moisture-adsorption side guiding portion that guides the air passing through the moisture-adsorption space to an internal part of the air-conditioning case.

7. The humidification device according to claim 4, wherein
the adsorption case is provided with a partition member that partitions the accommodating space into the moisture-adsorption space and the moisture-desorption space, and
the accommodating space is partitioned by the partition member such that an amount of the adsorbent existing in the moisture-adsorption space is larger than an amount of the adsorbent existing in the moisture-desorption space.

8. The humidification device according to claim 1, further comprising:
a desorption controller configured to execute a desorption process to desorb moisture, adsorbed in the adsorbent, when stopping humidification of the vehicle interior.

9. The humidification device according to claim 1, wherein
the air-conditioning case has a drain discharge portion formed at a part on a side of the cooling portion at the bottom surface portion of the air-conditioning case, the drain discharging portion being adapted to discharge condensed water generated in the cooling portion, and
the first introduction portion is connected to a part on the air-flow downstream, side relative to the drain discharge portion at the bottom surface portion of the air-conditioning case and on the air-flow downstream side of the cooling portion in the air-conditioning case.

10. An air conditioner for a vehicle, comprising:
an air-conditioning unit that accommodates a cooling portion that cools ventilation air and a heating portion that heats the ventilation air in an air-conditioning case that forms a ventilation passage for the ventilation air into a vehicle interior; and
a humidification device that desorbs moisture adsorbed in an adsorbent of an adsorber and guides humidification air, humidified by the moisture desorbed from the adsorbent, to the vehicle interior, wherein
the humidification device includes:
an adsorption case that forms an accommodating space to accommodate the adsorber;
a first introduction portion that introduces the cooled air produced by the cooling portion into the adsorption case as air that causes moisture to be adsorbed into the adsorbent;
a second introduction portion that introduces heated air produced by the heating portion into the adsorption case as air that causes the moisture adsorbed into the adsorbent to be desorbed from the adsorbent; and
a humidification-side guiding portion that guides the humidification air humidified by the moisture desorbed within the adsorption case to the vehicle interior, wherein the first introduction portion is connected to a bottom surface portion of the air-conditioning case on the air-flow downstream side of the cooling portion in the air-conditioning case.

11. A humidification device to be used for an air-conditioner, the air-conditioner being configured to accommodate a heat exchanger that cools ventilation air and a heater that heats the ventilation air in an air-conditioning case that forms a ventilation passage for the ventilation air into a vehicle interior, the humidification device comprising:
an adsorber including an adsorbent that adsorbs and desorbs moisture;
an adsorption case that defines an accommodating space to accommodate the adsorber;
a first introduction passageway that introduces cooled air produced by the heat exchanger into the adsorption case as air that causes moisture to be adsorbed into the adsorbent;
a second introduction passageway that introduces heated air produced by the heater into the adsorption case as air that causes the moisture adsorbed in the adsorbent to be desorbed from the adsorbent; and
a humidification-side guiding duct that guides humidification air humidified by the moisture desorbed within the adsorption case to the vehicle interior, wherein
the first introduction passageway is connected to a bottom surface of the air-conditioning case on an air-flow downstream side of the heat exchanger in the air-conditioning case.

12. The humidification device according to claim 11, wherein
the humidification-side guiding duct includes an opening separately formed from an outlet duct.

13. The humidification device according to claim 11, wherein
the adsorption case, the first introduction passageway, and the second introduction passageway are components separately formed from the air-conditioning case, and
the first introduction passageway and the second introduction passageway are configured to be detachable from the air-conditioning case.

14. The humidification device according to claim 11, further comprising:
a rotating drive shaft configured to move the adsorbent within the adsorption case, wherein
a moisture-adsorption space and a moisture-desorption space are set as the accommodating space in the adsorption case, the moisture-adsorption space being adapted to circulate the cooled air produced by the heat exchanger and to adsorb moisture, contained in the cooled air, into the adsorbent, the moisture-desorption space being adapted to circulate the heated air produced by the heater and to desorb moisture, adsorbed in the adsorbent, from the adsorbent, and
the rotating drive shaft is configured to move at least a part of the adsorbent existing in the moisture-desorption space of the adsorber to the moisture-adsorption space, while moving at least part of the adsorbent existing in the moisture-adsorption space of the adsorber to the moisture-desorption space.

15. The humidification device according to claim 14, further comprising:
a gas-gas heat exchanger that exchanges heat between air passing through the moisture-adsorption space and air passing through the moisture-desorption space.

16. The humidification device according to claim 14, further comprising:

a moisture-adsorption side guiding duct that guides the air passing through the moisture-adsorption space to an internal part of the air-conditioning case.

17. The humidification device according to claim 14, wherein the adsorption case is provided with a partition that partitions the accommodating space into the moisture-adsorption space and the moisture-desorption space, and the accommodating space is partitioned by the partition such that an amount of the adsorbent existing in the moisture-adsorption space is larger than an amount of the adsorbent existing in the moisture-desorption space.

18. The humidification device according to claim 11, further comprising:

a desorption controller configured to execute a desorption process to desorb moisture, adsorbed in the adsorbent, when stopping humidification of the vehicle interior.

19. The humidification device according to claim 11, wherein the air-conditioning case has a drain discharge duct formed at a part on a side of the heat exchanger at the bottom surface of the air-conditioning case, the drain discharging duct being adapted to discharge condensed water generated in the heat exchanger, and the first introduction passageway is connected to a part on the air-flow downstream side relative to the drain discharge duct at the bottom surface of the air-conditioning case and on the air-flow downstream side of the heat exchanger in the air-conditioning case.

* * * * *